United States Patent
Bradley, Jr.

(10) Patent No.: US 6,786,012 B2
(45) Date of Patent: *Sep. 7, 2004

(54) MOUNTING APPARATUS AND PHOTOVOLTAIC MOUNTING SYSTEM FOR A SOLAR PANEL AND METHOD OF MOUNTING A SOLAR PANEL

(75) Inventor: Donald Bradley, Jr., Philadelphia, PA (US)

(73) Assignee: Solar Strategies Development, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/369,291

(22) Filed: Feb. 18, 2003

(65) Prior Publication Data

US 2003/0121220 A1 Jul. 3, 2003

Related U.S. Application Data

(62) Division of application No. 09/636,378, filed on Aug. 11, 2000.
(60) Provisional application No. 60/148,989, filed on Aug. 11, 1999.

(51) Int. Cl.[7] .............................. E04D 1/34; E04D 13/10
(52) U.S. Cl. .............................. 52/173.3; 52/24; 52/544; 52/546; 52/27; 248/201; 248/237; 248/225.21; 136/244; 136/291
(58) Field of Search ............................. 52/173.3, 24, 544, 52/546, 27, 26, 41, 43, 91.3, 93.1, 57, 58, 770, 506.05, 506.06, 520, 543, 547, 696, 702, 714, 713; 248/237, 201, 225.21, 224.7, 205.3, 683, 148, 301, 304; 136/244, 251, 291, 230; 126/271, 450

(56) References Cited

U.S. PATENT DOCUMENTS

| | | |
|---|---|---|
| 1,366,703 A | 1/1921 | Peter |
| 1,728,981 A | 9/1929 | Ropp |
| 2,149,818 A | 3/1939 | North |
| 2,172,796 A | 9/1939 | Krasin |
| 2,536,386 A | 1/1951 | Moore |
| 3,116,171 A * | 12/1963 | Leif Rongved et al. .... 136/245 |
| 3,178,138 A | 4/1965 | Hessdoerfer |
| 3,335,816 A | 8/1967 | Sastaunik |
| 3,735,540 A | 5/1973 | Thaler |
| 4,019,924 A * | 4/1977 | Kurth .......................... 136/251 |
| 4,040,867 A * | 8/1977 | Forestieri et al. ........... 136/244 |
| 4,067,317 A * | 1/1978 | Hubbard ..................... 126/271 |
| 4,111,188 A * | 9/1978 | Murphy, Jr. ................. 126/271 |
| 4,261,338 A * | 4/1981 | McAlister .................... 126/450 |
| 4,269,173 A * | 5/1981 | Krueger et al. ............. 126/450 |
| 4,446,945 A | 5/1984 | Anderson |
| 4,498,458 A * | 2/1985 | Soper ......................... 126/429 |
| 4,499,894 A * | 2/1985 | Buckley ..................... 126/450 |
| 4,565,465 A * | 1/1986 | Oberst ........................ 403/187 |

(List continued on next page.)

FOREIGN PATENT DOCUMENTS

| | | | |
|---|---|---|---|
| CA | 461038 | 2/1937 | |
| CH | 77767 | 10/1918 | |
| EP | 0 929 106 A2 | 7/1999 | |
| FR | 1291372 | 3/1962 | |
| FR | 2301650 | 9/1976 | |
| GB | 682792 | 11/1952 | |
| GB | 2228502 | 8/1990 | |
| WO | WO 98/07196 A1 | 2/1998 | |
| WO | 00/12839 * | 3/2000 | ............... 52/173.3 |

Primary Examiner—Phi Dieu Tran A
(74) Attorney, Agent, or Firm—Kirk D. Houser; Eckert Seamans Cherin & Mellott, LLC

(57) ABSTRACT

A photovoltaic mounting apparatus for use with a solar panel includes a base element having an elongated upper portion and a lower portion. The upper portion is structured for engagement with a rooftop by being positioning underneath the shingles of a rooftop and secured thereto through the apertures of the upper portion and/or lower portion of the base element. One or more support elements extend perpendicularly from the lower portion of the base element. A front plate is situated upon the support elements and is parallel to the base element and structured for engagement with the solar panel.

20 Claims, 3 Drawing Sheets

U.S. PATENT DOCUMENTS

| | | | | |
|---|---|---|---|---|
| 4,677,248 A | * | 6/1987 | Lacey | 136/244 |
| 4,692,557 A | | 9/1987 | Samuelson et al. | |
| 4,788,801 A | | 12/1988 | Jones | |
| 4,913,297 A | * | 4/1990 | Wells | 211/96 |
| 4,982,542 A | | 1/1991 | Funaki | |
| 5,123,208 A | | 6/1992 | Kirby et al. | |
| 5,164,020 A | * | 11/1992 | Wagner et al. | 136/251 |
| RE34,404 E | | 10/1993 | Dupont et al. | |
| 5,409,549 A | | 4/1995 | Mori | |
| 5,505,788 A | * | 4/1996 | Dinwoodie | 136/246 |
| 5,571,338 A | | 11/1996 | Kadonome et al. | |
| 5,669,184 A | | 9/1997 | Anderson | |
| 5,743,063 A | | 4/1998 | Boozer | |
| 6,065,255 A | * | 5/2000 | Stern et al. | 52/173.3 |
| 6,155,006 A | * | 12/2000 | Mimura et al. | 52/173.3 |
| 6,230,466 B1 | | 5/2001 | Pryor | |
| 6,370,828 B1 | * | 4/2002 | Genschorek | 52/200 |
| 6,420,645 B1 | * | 7/2002 | Ohtsuka et al. | 136/251 |

* cited by examiner

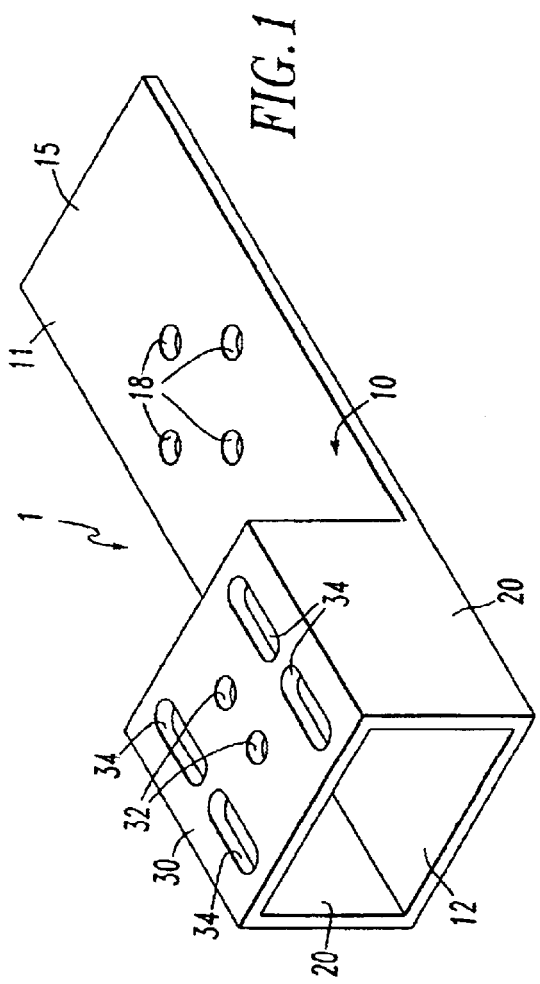
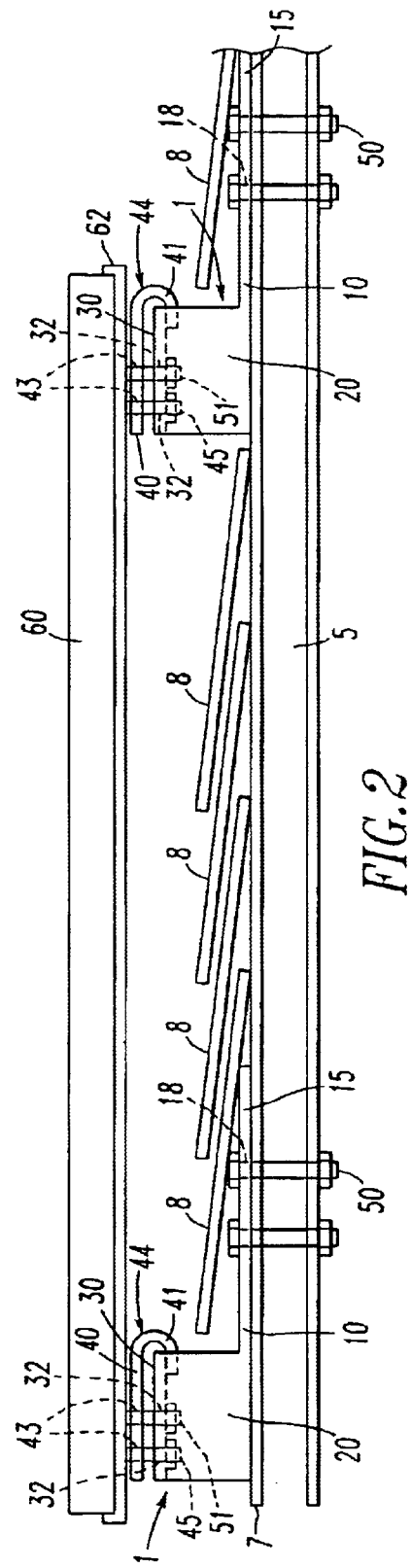

MOUNTING APPARATUS AND PHOTOVOLTAIC MOUNTING SYSTEM FOR A SOLAR PANEL AND METHOD OF MOUNTING A SOLAR PANEL

CROSS REFERENCE TO RELATED APPLICATION

This is a divisional of application Ser. No. 09/636,378, filed Aug. 11, 2000 (pending), which claims the benefit of U.S. Provisional Patent Application Serial No. 60/148,989, filed Aug. 11, 1999.

BACKGROUND OF THE INVENTION

1. Field of the Invention

The invention is directed to mounting apparatus and methods and, in particular, to such apparatus and methods for use in mounting a solar panel.

2. Background Information

The installation of photovoltaic (PV) or solar panels on rooftops with shingles has been riddled with numerous problems. Most solar panels are installed on rooftops by mounting a plurality of panels or array of panels into a rack and screwing or lag screwing the rack onto the rooftop. When the solar panels and rack are secured into place onto the rooftop, the installer must make a penetration through the roofing membrane including the roof shingles, the roofing paper and roofing sheathing. The penetration of the roof shingles damages the shingles, makes them less weather resistant, and potentially voids the warranty thereof.

The solar industry as well as the insurance and construction finance industry has been handcuffed by this problem. Many homeowners have rejected the use of solar panels because of the destruction of the roofing shingles and the potential loss of the warranty of the roofing shingle system. Numerous proposals and projects relating to the solar industry have been abandoned by insurers and lenders because of the potential voidance of roof shingle warranties.

The prior art shows that there is room for improvement in the known methods and apparatus for mounting a solar panel.

SUMMARY OF THE INVENTION

The present invention relates to a photovoltaic rooftop mounting apparatus for use with a solar panel.

As one aspect of the invention, a mounting apparatus for use with a solar panel comprises: a base element having an upper portion and a lower portion, the upper portion being structured for positioning under at least one shingle for engagement with a rooftop; at least one support element extending from the lower portion of the base element; and a front plate situated upon the support element, with the front plate being parallel to the base element and structured for engagement with the solar panel.

The upper portion of the base element may be elongated for positioning under the at least one shingle.

As another aspect of the invention, a mounting apparatus for use with a solar panel comprises: a base element having an upper portion and a lower portion, the upper portion being structured for engagement with a rooftop; at least one support element extending from the lower portion of the base element; a front plate situated upon the support element, the front plate being parallel to the base element; and a hooking device including a body and a hook, with the body of the hooking device being structured for engagement with the solar panel, and the hook of the hooking device being structured to engage the front plate.

Preferably, the body of the hooking device includes at least one aperture, and the front plate includes at least one aperture corresponding to the aperture of the body of the hooking device. The body of the hooking device and the front plate may be structured for engagement by a securing system at the apertures thereof. The securing system may comprise a screw, a washer, a lock washer, and a nut.

As a further aspect of the invention, a photovoltaic mounting system for use with a solar panel comprises: at least one photovoltaic mounting apparatus comprising: a base element having an upper portion and a lower portion, the upper portion being structured for engagement with a rooftop, at least one support element extending from the lower portion of the base element, and a front plate situated upon the support element, the front plate having an aperture and being parallel to the base element; at least one hooking device comprising: a body having an aperture corresponding to the aperture of the front plate, the body being structured for engagement with the solar panel, and a hook being structured to engage the front plate; and means for securing the body of the hooking device and the front plate at the apertures thereof.

As another aspect of the invention, a method of mounting a solar panel onto a rooftop having shingles comprises the steps of: providing a photovoltaic mounting system comprising: at least one photovoltaic mounting apparatus comprising a base element having an upper portion and a lower portion, the upper portion having at least one aperture, at least one support element extending from the lower portion of the base element, and a front plate situated upon the support element, the front plate being parallel to the base element; and at least one hooking device comprising a body being structured for engagement with the solar panel, and a hook being structured to engage the front plate; positioning the upper portion of the mounting apparatus underneath at least one shingle of the rooftop and securing the mounting apparatus onto the rooftop through the aperture of the upper portion of the base element; overlapping the at least one shingle of the rooftop over the upper portion of the base element of the mounting apparatus; securing the hooking device to the solar panel; and hooking the hook of the hooking device onto the front plate of the mounting apparatus.

Preferably, the method further comprises providing the front plate with at least one aperture; providing the body of the hooking device with at least one aperture corresponding to the aperture of the front plate; and aligning the aperture of the hooking device with the aperture of the front plate. The hooking device may be secured to the front plate.

Preferably, the method further comprises attaching a safety securing hook to the base element.

BRIEF DESCRIPTION OF THE DRAWINGS

A full understanding of the invention can be gained from the following description of the preferred embodiments when read in conjunction with the accompanying drawings in which:

FIG. 1 is an isometric view of a photovoltaic mounting apparatus in accordance with the present invention;

FIG. 2 is a cross-sectional view of the photovoltaic mounting system of the present invention in use with a solar panel;

DESCRIPTION OF THE PREFERRED EMBODIMENTS

Figure 3:
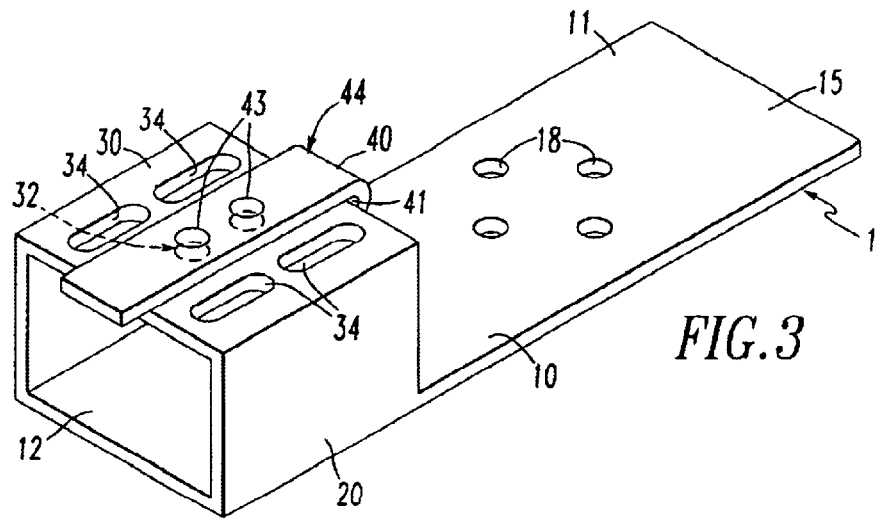
FIG. 3 is an isometric view of a hooking device functioning with the photovoltaic mounting apparatus of FIG. 1.

Referring now to the drawings wherein like reference numerals designate identical or corresponding parts throughout the several views, and more particularly to FIG. 1 whereon a photovoltaic mounting apparatus 1 in accordance with the invention is illustrated. The apparatus 1 comprises a base element 10 having an upper portion 11 and a lower portion 12. The exemplary upper portion 11 includes an extended portion 15 and at least one aperture 18 (four apertures 18 are shown in FIG. 1). The mounting apparatus 1 also comprises at least one support element 20 (two support elements 20 are shown in FIG. 1), which is perpendicular to the base element 10. The apparatus 1 further comprises a front plate 30 situated on the support element 20. The front plate 30 is perpendicular to the support element 20 and parallel to the base element 10. The front plate 30 has at least one aperture 32 (two apertures 32 are shown in FIG. 1), and, in the exemplary embodiment, the front plate 30 has at least one elongated aperture 34 (four apertures 34 are shown in FIG. 1).

The base element 10 of the mounting apparatus 1 may have a width from about 1 inch to about 14 inches, and a length from about 6 inches to about 20 inches. The height of the support element 20 may be from about 1 inch to about 8 inches. The front plate 30 may have a width from about 2 inches to about 14 inches, and a length from about 2 inches to about 14 inches.

FIG. 2 depicts a cross-sectional view of the photovoltaic mounting system of the present invention. The system comprises the photovoltaic mounting apparatus 1 and a hooking device 44. The mounting apparatus 1 comprises a base element 10 having an extended portion 15 and at least one aperture 18. The support element 20 extends perpendicularly from the base element 10 and the front plate 30 is situated upon the support element 20 and is parallel to the base element 10. The extended portion 15 of the base element 10 is positioned underneath the one (as shown at the right side of FIG. 2) or more (as shown at the left side of FIG. 2) shingles 8 of the roof sheathing 5 (which may be plywood) and secured onto the roof sheathing 5 using the securing system 50 situated within the aperture 18 of the base element 10. The securing system 50 penetrates the roof paper 7 and the roof sheathing 5.

The hooking device 44 is secured by a fastener 45 onto a rack or rails 62 of a solar panel 60. The hooking device 44 comprises a body 40, a hook 41, and at least one aperture 43. The hook 41 of the hooking device 44 is secured onto the front plate 30 of the mounting apparatus 1. The securing system 51 is secured within one or more aperture 43 of the hooking device 44 and one or more aperture 32 of the front plate 30 of the photovoltaic mounting apparatus 1. The solar panel 60 and rack 62 are thus mounted onto the mounting apparatus 1.

FIG. 3 illustrates an isometric view of the photovoltaic mounting apparatus 1 and the hooking device 44 of the present invention. The mounting apparatus 1 comprises a base element 10, a support element 20 and a front plate 30. The base element 10 has upper and lower portions, 11 and 12, respectively. The upper portion 11 has an extended portion 15, which is positioned underneath a shingle (not shown), and at least one aperture 18. The support element 20 extends perpendicularly from the lower portion 12 of the base element 10. The front plate 30 is situated upon the support element 20 and is perpendicular to the support element 20 and parallel to the base element 10. The hooking device 44 comprises a body 40 and at least one hook 41 at one end of the body and at least one aperture 43. During installation, the hook 41 is secured underneath the front plate 30 of the mounting apparatus 1 and the aperture 43 of the hooking device 44 is aligned with the aperture 32 of the mounting apparatus 1.

The mounting apparatus 1 and hooking device 44 may be made of any suitable material, such as, for example, aluminum, stainless steel or exterior rated fiberglass. Any PV panel or solar hot water panel may be utilized with the photovoltaic mounting system of the present invention. The mounting apparatus 1 can be used on new construction, retrofits or any solar installation. The mounting system can be utilized with various roofing shingles including, but not limited to, asphalt shingles, slate, or cedar shake shingles.

Figure 4:
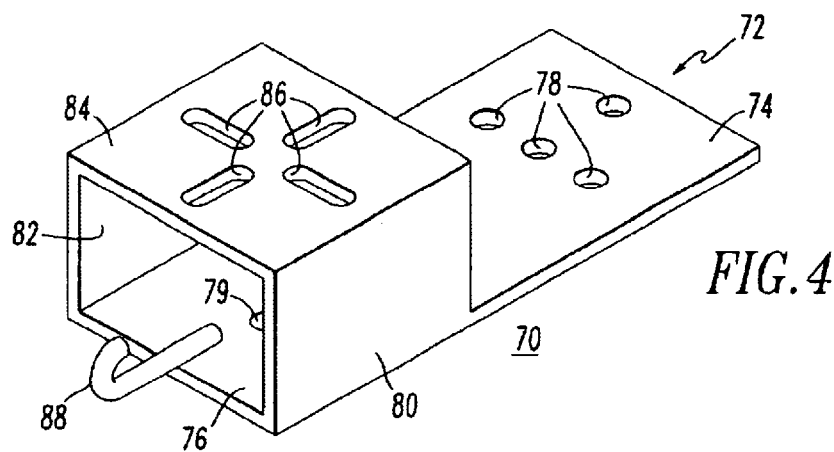
FIG. 4 is an isometric view of another photovoltaic mounting apparatus in accordance with another embodiment of the present invention.

FIG. 4 shows another photovoltaic mounting apparatus 70 in accordance with another embodiment of the present invention. The apparatus 70 comprises a base element 72 having upper portion 74 and a lower portion 76. The upper portion 74 includes one to four or more exemplary apertures 78, and the lower portion 76 includes at least one exemplary aperture 79, although a wide range of aperture counts may be employed. One or more of the apertures 78 are employed with a suitable securing system (not shown) to secure the base element 72 to a rooftop (not shown). Also, for application of the mounting apparatus 70 in a hurricane area, the aperture 79 is employed with a suitable securing system to further secure the lower portion 76 of the base element 72 to the rooftop.

The mounting apparatus 70 also comprises two exemplary support elements 80, 82, which are preferably perpendicular to the base element 72. The apparatus 70 further comprises a front plate 84 situated on the support elements 80, 82. The front plate 84 is preferably perpendicular to the support elements 80, 82 and preferably parallel to the base element 72. The front plate 84 has four apertures 86, and, in the exemplary embodiment, the apertures 86 are oval holes disposed in a star pattern. The oval apertures 86 may advantageously be employed for securing the front plate 84 to horizontal or perpendicular rails (not shown) for mounting a PV or solar panel (not shown).

Figure 7:
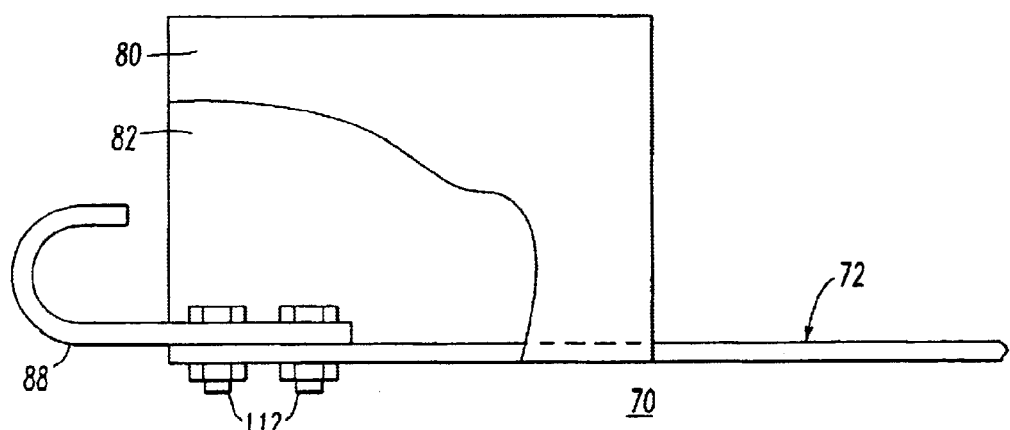
FIG. 7 is a side elevation view of the photovoltaic mounting apparatus of FIG. 4, with one support element cut away to show the securing hook.

The mounting apparatus 70 further comprises a safety securing hook 88 which is suitably secured (e.g., welded, fastened, mechanically attached) to the base element 72 (see FIG. 7). The safety securing hook 88 is advantageously employed by installation personnel to attach the safety clip of restraining equipment (e.g., OSHA safety) (not shown) thereto after the mounting apparatus 70 is suitably secured to a rooftop (not shown).

The exemplary base element 72 of the mounting apparatus 70 has a width of about 4 inches, and a length of about 6 inches. The height of the support elements 80, 82 is about 2 inches. The front plate 84 has a width of about 4 inches, and a length of about 4 inches, although a wide range of dimensions, and types and counts of apertures, suitable for rooftop installation of the mounting apparatus 70, are possible.

Figure 5:
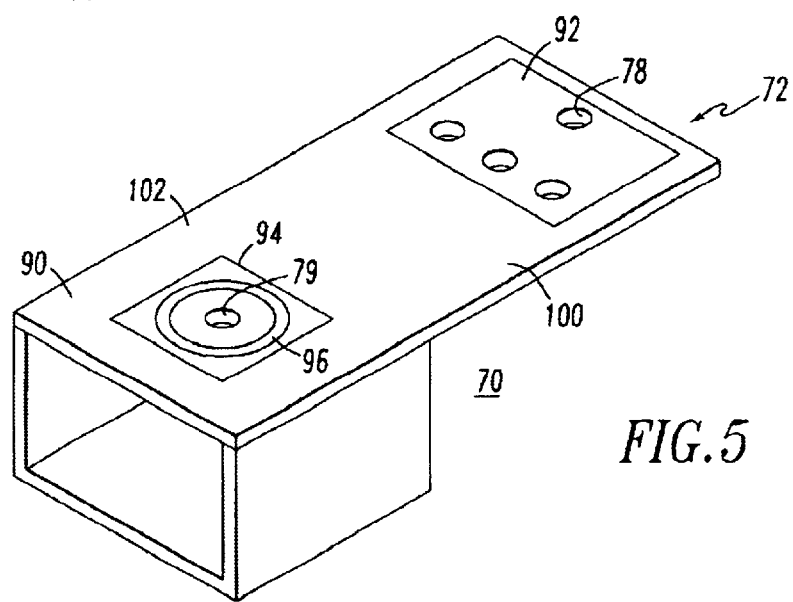
FIG. 5 is an isometric rear view of the photovoltaic mounting apparatus of FIG. 4 which shows rear weather protection.

Preferably, front and/or rear weather protection is employed for protecting the rooftop (not shown) in connection with the installation of the mounting apparatus 70. FIG. 5 shows a rear view of the mounting apparatus 70 in which rear weather protection is employed on the rear surface 90 of the base plate 72. For example, patches 92,94 (e.g., made of EDM rubber or double-sided tape) are suitably fastened to the rear surface 90 about the apertures 78,79, respectively. The patches 92,94 have openings which correspond to the aperture openings of the base plate 72, with the fasteners (e.g., screws) of the securing system (not shown) passing through such openings and apertures. The exemplary patches 92,94 completely prevent any water or moisture from getting behind the base plate 72 by sealing the penetrations. Also, by compressing around the apertures, the patches prevent moisture or water from entering the penetrations made by the securing system.

As an alternative to the patch 94, a suitable sealant (e.g., a relatively thick bead of 100% silicon caulk) (not shown) may be applied to a circular portion 96 about the aperture 79, during installation of the mounting apparatus 70 on the rooftop. As a further alternative to the patches 92,94, a single patch (not shown) (e.g., made of EDM rubber or double-sided tape) is suitably fastened to the rear surface 90 about the apertures 78,79. As a still further alternative, other configurations of one or more of such patches may be employed on the rear surface 90. For example, two relatively slender patches (not shown) may be suitably fastened to the rear surface 90 at about the full length of the edges 100,102 of such surface. The exemplary slender patches prevent any wind driven water, rain or moisture from getting behind the base plate 72 by sealing and/or compressing in order that no water goes through the holes associated with the securing system into the roof sheathing.

Figure 6:
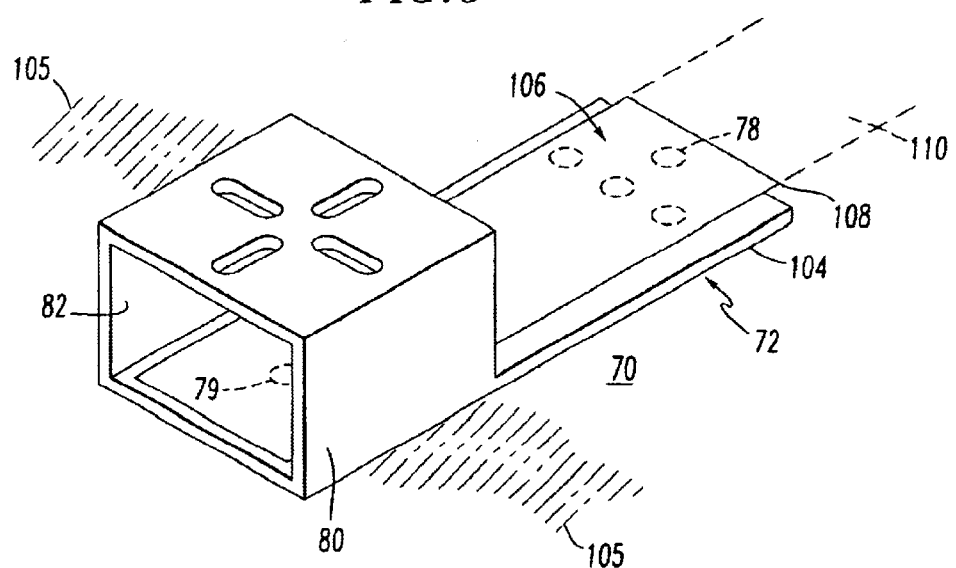
FIG. 6 is an isometric front view of the photovoltaic mounting apparatus of FIG. 4 which shows front weather protection.

FIG. 6 shows a front view of the mounting apparatus 70 in which front weather protection is employed on the front surface 104 of the base plate 72 as fastened to a rooftop 105. In the exemplary embodiment, a flashing technique is employed in which a portion of a conventional roofing shingle 106 is suitably fastened (e.g., such a shingle with an adhesive backing; by employing double-sided tape) to the front surface 104 of the mounting appartus 70. Preferably, the roofing shingle 106 is suitably cut (e.g., at 108) to the proper length and width of the base plate 72 between the supports 80,82, with an excess portion 110 being discarded or reused for installation with other such mounting apparatus 70. The properly sized shingle 106 functions to flash over or cover the securing apertures 78,79 (as shown in FIG. 4), in order that all corresponding penetrations in the rooftop 105 are suitably flashed. As an alternative to the conventional roofing shingle 106, EDM rubber tape may be employed.

FIG. 7 shows the safety securing hook 88 as secured to the base plate 72 by suitable fasteners 112, such as a screw, a washer, a lock washer, and a nut.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalents thereof.

What is claimed is:

1. A rooftop mounting system comprising:

a solar panel;

a rooftop comprising a plurality of shingles; and a mounting apparatus comprising:

a base element having an upper portion and a lower portion, the upper portion being positioned under at least one of said shingles, the upper portion being engaged by said at least one of said shingles and engaged with said rooftop;

at least one support element extending from the lower portion of said base element;

a front plate situated upon said support element, said front plate being parallel to said base element; and means for securing said solar panel to said front plate.

2. The rooftop mounting system of claim 1, wherein said base element includes at least one aperture.

3. The rooftop mounting system of claim 2, wherein said base element is engaged with said rooftop by a securing system at the aperture of said base element.

4. The rooftop mounting system of claim 3, wherein said securing system comprises a screw, a washer, a lock washer, and a nut.

5. The rooftop mounting system of claim 1, wherein said front plate includes at least one aperture.

6. The rooftop mounting system of claim 5, wherein said means for securing includes a securing system engaging said front plate at the aperture of said front plate.

7. The rooftop mounting system of claim 6, wherein said securing system comprises a screw, a washer, a lock washer, and a nut.

8. The rooftop mounting system of claim 1, wherein the upper portion of said base element is elongated and positioned under said at least one of said shingles.

9. A rooftop mounting system comprising:

a solar panel;

a rooftop comprising a plurality of shingles; and a mounting apparatus comprising:

a base element having an upper portion and a lower portion, the upper portion being positioned under at least one of said shingles, the upper portion being engaged by said at least one of said shingles and engaged with said rooftop;

at least one support element extending from the lower portion of said base element;

a front plate situated upon said support element, said front plate being parallel to said base element; and a hooking device including a body and a hook, the body of said hooking device engaging said solar panel, the hook of said hooking device engaging said front plate.

10. A rooftop mounting system comprising:

a solar panel;

a rooftop comprising a plurality of shingles; and a mounting apparatus comprising:

a base element having an upper portion and a lower portion, the upper portion being positioned under at least one of said shingles and engaged with said rooftop;

at least one support element extending from the lower portion of said base element;

a front plate situated upon said support element, said front plate being parallel to said base element; and a hooking device including a body and a hook, the body of said hooking device engaging said solar panel, the hook of said hooking device engaging said front plate, wherein the body of said hooking device includes at least one aperture; and wherein said front plate includes at least one aperture corresponding to the aperture of the body of said hooking device.

11. The rooftop mounting system of claim 10, wherein the body of said hooking device and said front plate are engaged by a securing system at the apertures thereof.

12. The rooftop mounting system of claim 11, wherein said securing system comprises a screw, a washer, a lock washer, and a nut.

13. The rooftop mounting system of claim 9, wherein the upper portion of said base element is elongated and positioned under said at least one of said shingles of said rooftop.

14. The rooftop mounting system of claim 9, wherein said base element includes a safety securing hook.

15. The rooftop mounting system of claim 9, wherein said base element includes a front surface and a rear surface, with at least one of said surfaces including weather protection for said rooftop.

16. The rooftop mounting system of claim 1, wherein said at least one of said shingles flashes over the upper portion of said base element.

17. The rooftop mounting system of claim 16, wherein the upper portion of said base element includes at least one aperture; wherein said base element is engaged with said rooftop by a securing system at said at least one aperture of the upper portion of said base element; and wherein said at least one of said shingles flashes over said securing system.

18. The rooftop mounting system of claim 9, wherein said at least one of said shingles flashes over the upper portion of said base element.

19. The rooftop mounting system of claim 10, wherein said at least one of said shingles engages the upper portion of said base element.

20. The rooftop mounting system of claim 19, wherein said at least one of said shingles flashes over the upper portion of said base element.

* * * * *